UNITED STATES PATENT OFFICE.

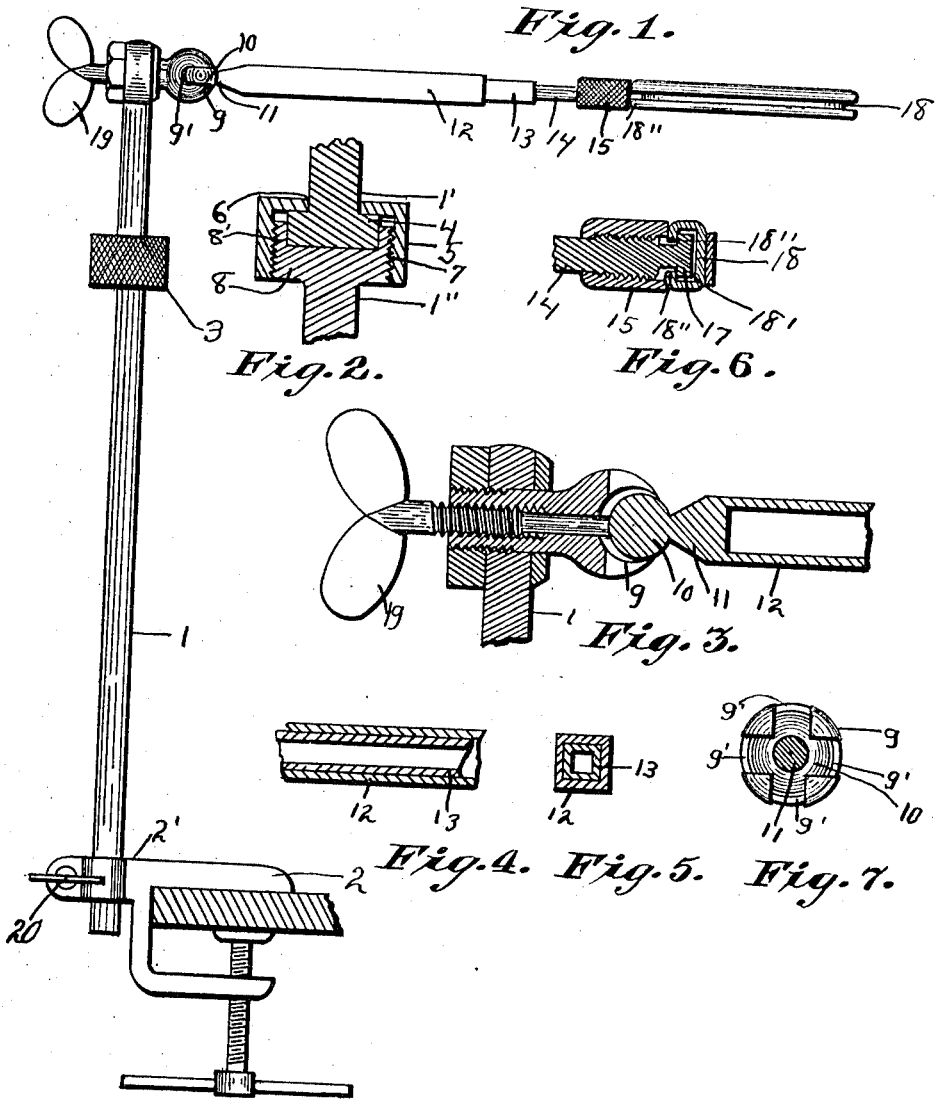

HENRY J. REINARTZ, OF CLEVELAND, OHIO.

EMBROIDERY-HOOP SUPPORT.

1,061,325.  Specification of Letters Patent.  Patented May 13, 1913.

Application filed December 16, 1910.  Serial No. 597,621.

*To all whom it may concern:*

Be it known that I, HENRY J. REINARTZ, a citizen of the United States, residing at Cleveland, in the county of Cuyahoga and State of Ohio, have invented certain new and useful Improvements in Embroidery-Hoop Supports; and I do hereby declare the following to be a full, clear, and exact description of the invention, such as will enable others skilled in the art to which it pertains to make and use the same.

This invention relates to embroidery hoop supports, and more particularly to the type which is adjustable.

The invention consists in the peculiar construction and combination and aggregation of parts such as will be hereinafter fully set forth in the following description.

The object of my invention is to produce a support that will enable a person to handle and adjust the support to any known or desired angle or position.

Another object of this invention is to produce a support which may have several adjusting parts and each being independent of any other adjusting part.

In the drawings this invention is clearly shown with each adjusting portion or point illustrated.

Figure I, is a view in side elevation showing the support as I intend to make it and illustrating the several adjusting joints. Fig. II, is a cross section of the swivel joint which is shown just below the extension on the vertical support in Fig. I. Fig. III, is a cross section of the ball and socket joint which is shown at the top of the vertical support in Fig. I. Fig. IV is a longitudinal section of the extension between the hoop and the vertical support. Fig. V is a cross section of the extension. Fig. VI, is a cross section of the sliding joint on the hoop, showing the manner of fastening the hoop in proper position. Fig. VII is a view showing the prongs of the ball and socket joint.

1, represents the main supporting spindle which is slidably fastened to a table or the like by means of a clamp fastener 2, hereinafter described. A swivel joint 3 is placed between the top of the main supporting spindle and the clamping member 2; preferably near the top. This swivel joint 3 is shown more clearly in Fig. II, in which 1' represents the upper part of the spindle and 1'' represents the lower part. A flange 4 is provided at the lower end of the section 1' which fits in a cup 5. This cup 5 has an orifice 6 on the upper surface to allow the section 1' to pass through the cup. On the inner side of the cup 5, screw threads 7 are provided. The lower section 1'' has a threaded enlarged portion 8 which fits into the cup 5. This enlarged portion 8 has a recess 8' into which fits the flange 4, thus making a positive and secure swivel joint. When the cap 5 is screwed down onto the threads of the portion 8 the several parts are brought together and held fast.

At the extreme upper end of the main supporting spindle 1, I have provided a ball and socket joint which is shown more clearly in Figs. III and VII in which the socket 9 has four openings 9', 9', 9', 9', allowing the hoop 18 to be placed at any desired radial position. The thumb screw 19 is screwed in and presses the ball 10 tightly against the inner side of the socket 9, thus holding the hoop in the desired position.

For the purpose of having the hoop nearer or farther away from the user of this device I have provided an extension tube which is composed of two or more sections 12 and 13. Integral with the neck 11, the section 12, is provided which is longer than the section 13. The section 13 is slidably mounted inside of the section 12 thus allowing the hoop to be brought forward or back as desired. At the end of section 13, a screw threaded bar 14 is provided, at the end of which is a flange 17 and this flange 17 is which in the recess 18' of the hoop 18. A nut 15 is provided on the screw threaded bar 14. The hoop is revolved to the proper position and then the nut 15 is screwed up to the flanges 18'' of the hoop thus bringing the flanges 18'', 18'', and the flange 17 of the bar 14 tightly together and holding the hoop in the adjusted position. The extension sections 12 and 13 are preferably formed of square tubing to prevent the turning of the hoop after being adjusted. This extension could be made of round tubing but in that case a fastener would be required. The means for adjusting the height is on the clamp 2. The projection 2', is split and has an opening for the spindle 1 to pass through. The thumb screw 20 is then turned and binds the spindle 1 in any desired position.

In describing and setting forth this invention I have shown and illustrated it as I, at the present time, think it best adapted for its purpose and have shown it in connection with an embroidery hoop but this device may be changed in details of construction and its use may be varied without departing from my invention, hence I do not wish to be limited to the exact construction and assemblage or to the specified use of the same.

What I claim is:

1. An embroidery hoop support of the class described, comprising the combination of an embroidery hoop, the outer ring of said embroidery hoop having at its upper edge an outwardly and downwardly projecting flange and at its under edge having an outwardly and upwardly projecting flange, a connection having a flanged head, said head adapted to fit and be mounted slidable in the channel formed by the flanges of the outer ring of the embroidery hoop.

2. An embroidery hoop support of the class described, having an embroidery hoop, the outer ring of said embroidery hoop having at its upper edge an outwardly and downwardly projecting flange and at its upper edge having an outwardly and upwardly projecting flange, in combination with a connection, said connection being screw-threaded and having a flanged head, said head being adapted to be slidably mounted in the channel of the outer embroidery hoop ring, and a nut adapted to be screwed onto the threaded portion of said connection for the purpose of fastening the connection in any predetermined place on the periphery of the outer embroidery hoop ring.

3. An embroidery hoop support, comprising the combination of a main supporting stem, a clamp for securing said stem in a predetermined height, a cup joint for adjusting and securing the upper portion of said stem in any radial position, a ball and socket joint adapted to hold the embroidery hoop at any desired plane, a telescoping extension located between the main supporting stem and the embroidery hoop, a slidable connection mounted in the outer ring of said embroidery hoop and means for fastening the slidable connection in relation to the embroidery hoop.

Signed at Cleveland in the county of Cuyahoga and State of Ohio this 1st day December 1910.

HENRY J. REINARTZ.

Witnesses:
JOHN J. DONNELLY,
FRANK C. GREGG.

---

Copies of this patent may be obtained for five cents each, by addressing the "Commissioner of Patents, Washington, D. C."